Dec. 4, 1951   R. J. DIETRICH ET AL   2,577,184
BARBECUE MACHINE
Filed May 3, 1948   2 SHEETS—SHEET 1

INVENTORS
RALPH J. DIETRICH
BY FRANCIS L. DIETERICH
Harold W. Mattingly
Attorney

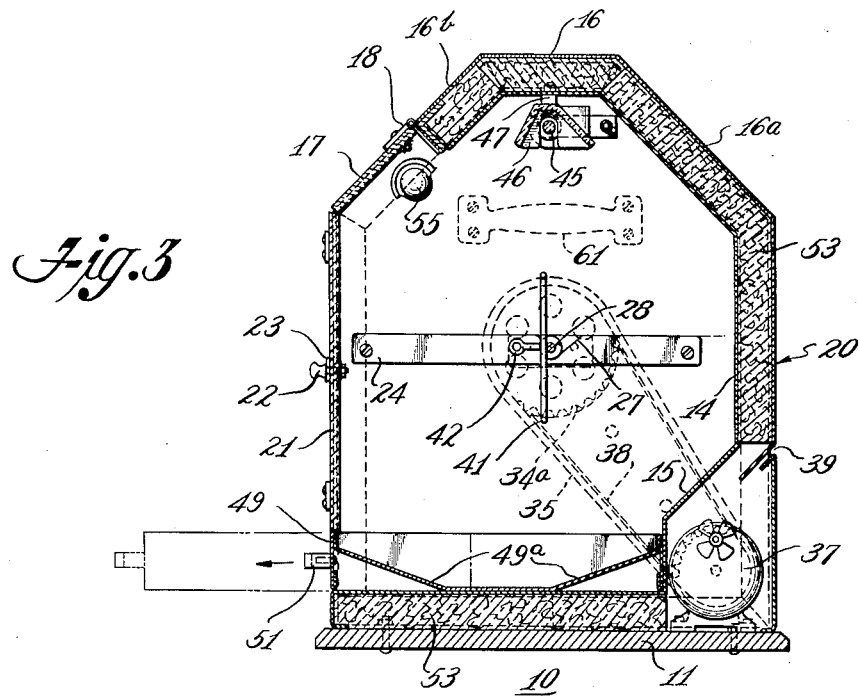
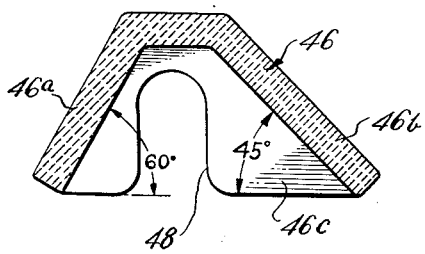

Patented Dec. 4, 1951

2,577,184

UNITED STATES PATENT OFFICE 2,577,184

BARBECUE MACHINE

Ralph J. Dietrich, Encino, and Francis L. Dieterich, Culver City, Calif.

Application May 3, 1948, Serial No. 24,754

3 Claims. (Cl. 99—421)

Our invention relates to barbecuing machines, and has particular reference to an electrically heated and electrically powered barbecue of improved design.

Barbecues constructed in accordance with our invention provide a maximum amount of visual inspection of the barbecuing process, and at the same time the cooking takes place within a confined enclosure. Further, the barbecue may be operated completely by electricity, both for the heat source and for the power source for rotating the spit. This permits ready installation of the barbecue, inasmuch as the plugging in of an electric cord is the only installation operation. Additionally, the barbecue may have illumination in the form of an electric lamp, facilitating night operation. Also, barbecue machines embodying our invention will not heat the room in which they are located.

A presently preferred embodiment of our invention may include a case of a size that may be placed conveniently upon a table, counter, or other readily accessible mount, and may, for example, be about two feet long and one and one-half feet high, and slightly over a foot in depth. Such a barbecue accommodates whole fowl, the usual cuts and roasts of meat, and steaks of all types. For roasting whole animals, a larger size of barbecue may be employed.

At present we prefer to employ corrosion resisting metals such as stainless steel for the case and to utilize a mineral insulation such as fiber glass or rock wool to prevent the escape of heat from the case. A high temperature heating element may be employed that is surrounded on one side by a refractory heat reflector. The high temperature at the surface of the reflector burns off any spattering of fat or juices from the meat, resulting in a clean reflector at all times. Hinged doors of tempered glass may be employed on the front of the barbecue so that the barbecued object may be observed as it cooks and rotates on the spit.

It is a general object of our invention to provide an improved electrically operated barbecue machine.

Another object of our invention is to provide a barbecue having a high temperature heater in combination with a heat reflector so that the reflector will burn clean.

Another object of our invention is to provide an electrically driven and electrically illuminated barbecue machine.

A further object of our invention is to provide a barbecue machine having a transparent side or sides that confine heat and splattering juices and permit observation of the barbecuing process.

Still a further object of our invention is to provide a barbecue machine that is insulated to prevent heating of the room in which it is operated and to increase barbecuing efficiency.

Another object of our invention is to provide a readily removable spit having a positive engagement with a driving mechanism.

Other objects and advantages of our invention will be apparent in the following description and claims, considered together with the accompanying drawings, in which Fig. 1 is a perspective view of a presently preferred embodiment of our invention;

Fig. 3 is a transverse sectional view of the barbecue machine as taken along the line III—III of Fig. 2;

Fig. 4 is an enlarged sectional view through the refractory reflector; and

Fig. 5 is an enlarged elevation view of a fragment of the rod type heating element employed in our barbecue.

Figure 1:
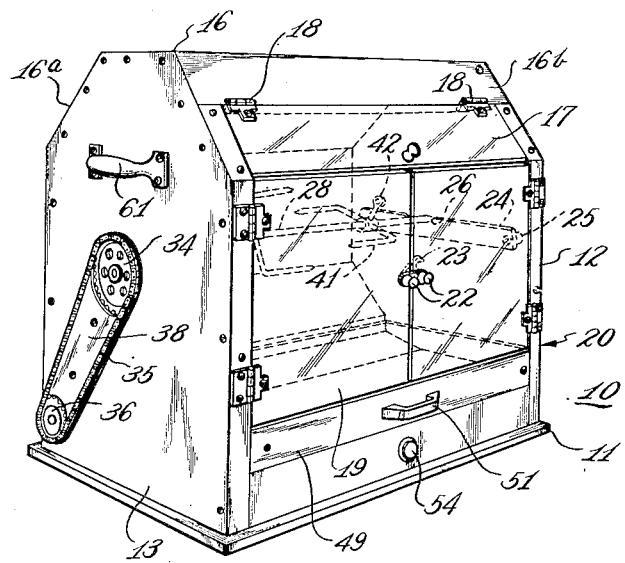

Referring to Fig. 1, our barbecue machine 10 may employ a hardwood base 11 upon which may be mounted a double walled case 20 including side walls 12 and 13 as well as a rear wall 14 having a forwardly inclined lower portion 15. A top may be provided for the barbecue 10 including a flat upper portion 16, a downwardly inclined rear portion 16a, and a downwardly inclined forward portion 16b. The portion 16b, however, extends only part of the distance toward a vertical front wall, the remainder of the space being occupied by a glass plate 17 pivoted to the top portion 16b by hinges 18. Likewise the front wall of the barbecue 10 may include a pair of hinged glass doors 19 and 21 suitably hinged to the side walls 12 and 13 and which may be opened by knobs 22, one of which may include a rotatable latch 23 for locking the two doors in a closed position.

The glass doors 19 and 21, together with the hinged plate 17, may be formed of heat tempered glass so that the glass will stand high temperatures without cracking. The glass not only confines the heat within the case, but also prevents the splattering of juices and permits visual inspection of the barbecuing process.

Secured to the inner walls of the side walls 12 and 13 may be horizontal bars or rails 24 suitably spaced therefrom by spacers 25. The rod against end 12 may have a small notch 26 cut therein, and the rod against the other wall may have a large notch 27 cut therein. A spit 28 may have a tapered point 29 on one end and may have a crown fitting 31 on the other end. The point may rest in the small notch 26, whereas the crown fitting 31 may fit within the large notch 27. The end wall 13 may be provided with a bearing block 32 in which may rotate a drive shaft 33 having a mating crown fitting 34 on its inner end to engage the spit crown fitting 31.

The drive shaft 33 may in turn be driven by a pulley 34a driven by a chain 35 connected to a pulley 36 which is driven by an electric motor 37 (Fig. 3). A guard plate 38 may be disposed between the two pulleys to prevent accidental insertion of objects in between the pulleys and the chain, which guard will also permit maximum observation of the mechanical action. As noted particularly in Fig. 3, the motor may be disposed in a rear compartment formed by the forwardly sloping rear wall portion 15, and slots 39 may be provided at the top of this compartment to allow the circulation of cooling air for the electric motor 37.

It will be noted that by supporting the point 29 along its tapered surface, the weight of any meat, fowl, or other object forces the spit rod 28 into engagement with the driving crown 34. In this connection it should be noted that the crown fittings 31 and 34 may have radial sector crown portions so that the two fittings will be locked to each other with regard to their axis of rotation. However, the spit 28 may be simply removed by lifting the point 29 and sliding the crown fittings out of engagement. Meat may be retained upon the spit 28 by a pair of forks 41, each of which may be adjustably slid along the length of the rod 28 or removed entirely, and which may be held in any selected position by means of thumb screws 42.

Figure 2:
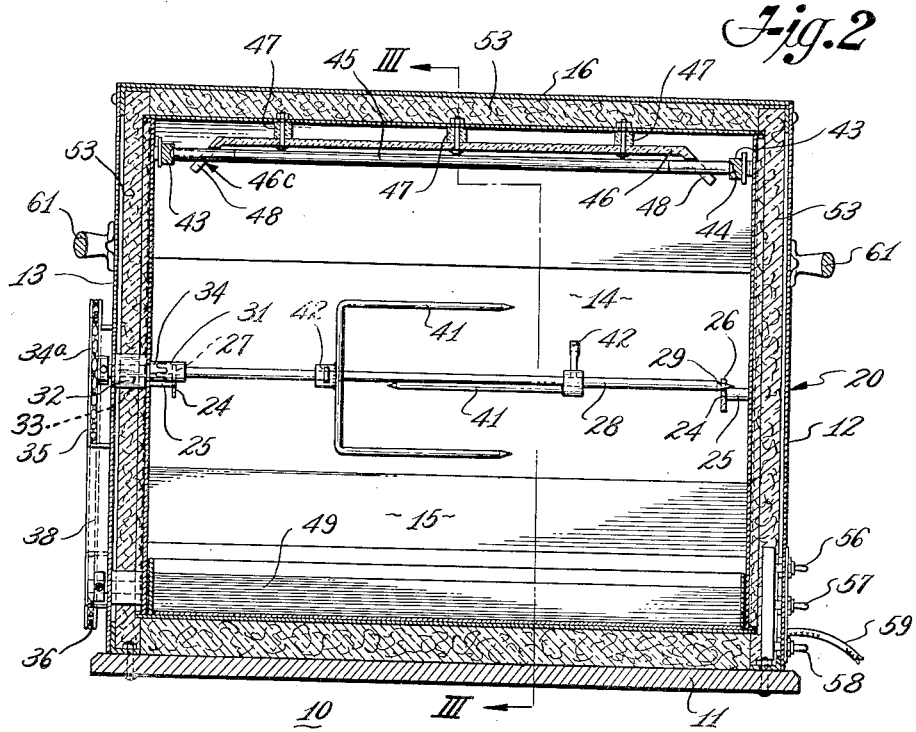
Fig. 2 is a vertical sectional view through the barbecue of Fig. 1.

We prefer to employ a rod type of electrical heating element in our barbecue, and have found that Carborundum is a very suitable material for this purpose. Not only does it supply a proper electrical resistance, but it is corrosion-resistant and juices, fat, and other substances coming into contact with its surface will not interfere with its operation, and these substances will be soon burned off by the high operating temperature. Referring particularly to Figs. 2 and 5, it will be noted that a pair of spring contact blocks 43 may be provided at the top portion of each side wall, and may have a shallow dished depression 44. A heating rod 45, preferably formed of Carborundum, may be held between these two contacts 43 by fitting in the depressions 44, and the resilient mounting of the blocks 43 will hold the rod securely. The rod 45 preferably has portions adjacent its end that are of low resistance so as to be low in temperature, and this low resistance portion is illustrated in Fig. 5 by the dimension L. Also, the tips of the rod 45 may be coated with aluminum or other suitable metallic conductor so as to afford a good electrical contact between the rod and the contact blocks 43. The extent of this metalized portion is indicated by the letter X in Fig. 5.

A reflector 46 may be provided particularly in accordance with our invention, and may be secured to the flat portion 16 of the upper wall by means of insulating spacers 47. The reflector 46 may have a forward wall 46a that is more sharply inclined than a rear wall 46b to prevent direct radiant heat from striking the glass doors 19 and 21. The ends of the reflector 46 may be beveled as at 46c, and may have slots 48 formed therein so that the heater rod 45 may pass through the interior of the reflector 46. It will be noted that the mounting of the reflector 46 is such with respect to the mounting of the rod 45 that there is no physical contact between the two.

The reflector 46 is preferably made of a high temperature refractory having a white, natural color, and we have found that zirconium dioxide ($ZrO_2$), otherwise known as zirconia or zircite, is inherently satisfactory. This is due to the fact that zirconia may be obtained in white form, which color is retained throughout the entire heating of the substance and in fact is retained even when the zirconia is heated to incandescence. Therefore it is possible to employ a high temperature heater with the zirconium dioxide so that any splattering of grease or other substances upon the reflector will be immediately burned off, thus causing the reflector to remain clean and white during all operations, permitting it to reflect a maximum amount of the radiant energy onto the food being cooked. We have found that the use of a Carborundum rod three-eighths of an inch in diameter and having a high resistance portion approximately fourteen inches long and consuming one thousand watts at one-hundred and fifteen volts will give rise to the proper temperature for burning off the grease splatterings, which temperature may be in the red heat region.

Referring to Figs. 1 and 3, it will be noted that a gravy pan 49 may be provided for the bottom of the barbecue 10, which pan may slide as a drawer as illustrated in Fig. 3. In this connection, a handle 51 may be provided for manually moving the pan. The pan 49 may have at least two sides of its bottom inclined downwardly as at 49a so that a grill may be supported on the inclined portions in spaced relation from the bottom of the pan. The pan 49 may be removed from the bottom, and by opening the doors 19 and 21 may be placed upon the side wall rods 24 so that it will be closely adjacent to the heater rod 45. A steak grill may be placed upon the pan in this position, and steaks or other flat cuts of meat may be disposed on the grill for broiling or otherwise barbecuing the meat. This second position of the pan disposes the meat at approximately the same distance from the heater bar 45 as the exterior of the average size of meat being rotated on the spit 28. Thus the gravy pan 49 serves not only to collect gravy, but alternatively may be used as a roasting pan for steaks and the like.

It will be noted, especially in Figs. 2 and 3, that the double wall construction permits the insertion of an insulation 53 between the walls, thus providing a high insulation characteristic to the entire barbecue. This insulation is preferably of a mineral type such as fiber glass, rock wool, perlite, vermiculite, etc. This insulation, together with the heat-resisting glass front of the barbecue, retains the heat within the barbecue case. This not only prevents the room in which the barbecue is used from becoming heated, but also provides an increase in temperature within the case so that a roasting action takes place as well as the usual broiling or barbecuing action.

Inasmuch as the heater bar 45 is obscured from visual inspection by the reflector 46, a signal light may desirably be employed to indicate when the heater is energized. Accordingly, a light 54 may be disposed in the front of the machine, and may be connected in the electrical circuit of the heater bar 45. Likewise an illuminating light 55 (Fig. 3) may be employed for lighting the interior of the case when the barbecue is operated at night. A suitable switch arrangement may be employed as illustrated in Fig. 2 which may include an upper switch 56 for the heater element 45 and its signal light 54, an intermediate switch 57 for the illuminating light 55, and a lower switch 58 for the electric motor 37 for rotating the spit. A single extension cord 59 may supply energy to all three of these devices, and therefore the plugging in of the cord 59 is the only installation operation required. A pair of handles 61 may be provided for manually lifting the machine to any desired location.

In operation, meat, fowl, or other food item may be impaled upon the spit rod 28 by lifting its pointed end 29 out of the notch 26 and disengaging the crown fitting 31 from the driving crown 34. The thumb screw 42 on the outer fork 41 may be loosened and that fork slid off the pointed end. The spit 28 may then be passed through the food product until it is impaled upon the other fork 41, and the removed fork may then be replaced on the spit 28 and both forks secured in any desired position. The spit 28 may then be returned into the machine, and the crowns 31 and 34 engaged with the point 29 of the spit resting in the notch 26.

The meat having been disposed upon the spit 28, the operator may next turn on the heating element 45 by manually operating the switch 56, which switch will also cause illumination of the light 54 to give a visual indication of the operation of the heater bar 45. The motor may next be operated by operating the switch 58, and if at night, the switch 57 may be operated to energize to light 55. The motor will drive through the chain 35 to cause the spit to rotate, thus exposing all sides of the food item to the heat of the rod 45. At all times the cooking process may be observed through the glass doors 19 and 21. When it is desired to remove the meat or other food item from the spit, the doors may be opened as well as the hinged glass plate 17, thus opening the entire front portion of the barbecue. The spit may be removed by lifting the pointed end first, and thereafter disconnecting the crown fittings 31 and 34.

If it is desired to broil a steak, the pan 49 may be removed from its lower position as illustrated in Fig. 3, and may be supported upon the rods 24. The meat product may be supported upon a conventional broiler grill disposed in the pan, and the pan will collect the juices.

At all times the reflector 46 will remain clean and white due to the high temperature of the Carborundum rod 45 burning off any splatterings. The heat of the cooking operation will be confined to the enclosed case as well as the insulation 53.

While we have described our invention with respect to a specific embodiment thereof, it will be obvious to those skilled in the art that various modifications could be made therein without departing from the true spirit and scope of our invention. For this reason the disclosed embodiment is merely illustrative, and is not limiting or definitive of our invention.

We claim:

1. In a barbecue, the combination of: a housing comprising a box-like structure having a bottom, two spaced parallel end walls, a back, and a top, the front of said housing being open; a door structure formed of transparent material hinged to said end walls and movable to close said open front of said housing; a spit having a shaft extending horizontally across said housing below said top between said end walls for supporting food to be cooked; an elongated radiant heating element extending between said end walls above said spit and parallel thereto; and a trough-like reflector above said heating element for concentrating radiant heat onto said food to be cooked, said trough-like reflector being disposed open-side down and including outwardly and downwardly extending rear and forward portions, said forward portion being steeply inclined and of sufficient vertical extent to shade said door structure, and said rear portion being less steeply inclined.

2. In a barbecue, the combination of: a housing comprising a box-like structure having a bottom, two spaced parallel end walls, a back, and a top, the front of said housing being open; a door structure formed of transparent material hinged to said end walls and movable to close said open front of said housing; a spit having a shaft extending horizontally across said housing below said top between said end walls for supporting food to be cooked; an elongated radiant heating element extending between said end walls above said spit and parallel thereto; and a trough-like reflector above said heating element for concentrating radiant heat onto said food to be cooked, said trough-like reflector being disposed open-side down and including outwardly and downwardly extending rear and forward portions, said forward portion being steeply inclined and of sufficient vertical extent to shade said door structure, and said rear portion being less steeply inclined, said reflector being formed of a white refractory material and disposed sufficiently close to said heating element to have the inner surface thereof heated to incandescence by said heating element to provide a secondary source of radiant heat for cooking said food.

3. In a barbecue, the combination of: a housing comprising a box-like structure having two spaced parallel end walls, a back, and a top, the front of said housing being open; a door structure formed of transparent material hinged to said end walls and movable to close said open front of said housing; an electrical radiant heating element comprising a Carborundum rod extending horizontally between said end walls across the upper portion of the inside of said housing substantially midway between the back and front thereof; food supporting means carried by said housing below said heating element for supporting food to be cooked; and a trough-like reflector above said heating element for concentrating radiant heat onto said food to be cooked, said trough-like reflector being disposed open-side down and including outwardly and downwardly extending rear and forward portions, said forward portion being steeply inclined and of sufficient vertical extent to substantially shade said door structure.

RALPH J. DIETRICH.
FRANCIS L. DIETERICH.

REFERENCES CITED

The following references are of record in the file of this patent:

UNITED STATES PATENTS

| Number | Name | Date |
| --- | --- | --- |
| 1,085,671 | Day | Feb. 3, 1914 |
| 1,344,915 | Love | June 29, 1920 |
| 1,702,900 | Humphrey | Feb. 19, 1929 |
| 1,790,488 | Saunders et al. | Jan. 27, 1931 |
| 2,156,860 | Lucas et al. | May 2, 1939 |
| 2,179,646 | Spartalis | Nov. 14, 1939 |
| 2,245,220 | Nelson | June 10, 1941 |
| 2,330,132 | Martin et al. | Sept. 21, 1943 |
| 2,377,873 | Finizie | June 12, 1945 |
| 2,379,239 | Krebs | June 26, 1945 |
| 2,388,831 | Cramer | Nov. 13, 1945 |
| 2,502,685 | Warner | Apr. 4, 1950 |